June 8, 1965 B. A. SMITH 3,188,288
METHOD FOR CONTROLLING THE MICROBE AND SOLID MATERIALS
IN SEWAGE TREATMENT EQUIPMENT
Filed March 12, 1962
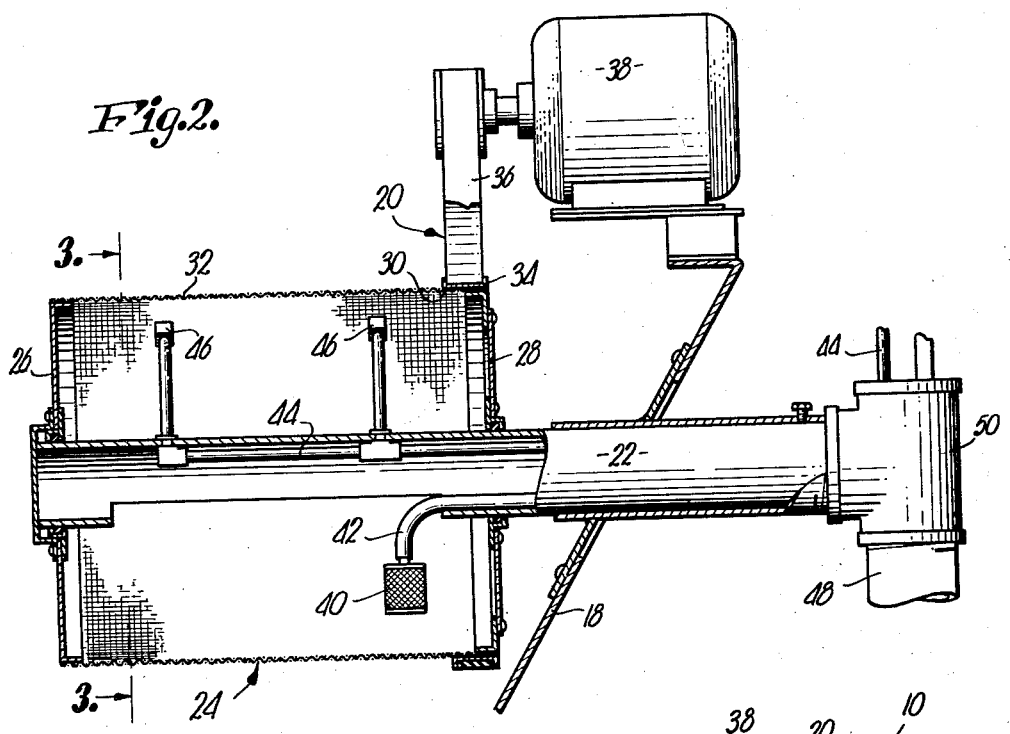
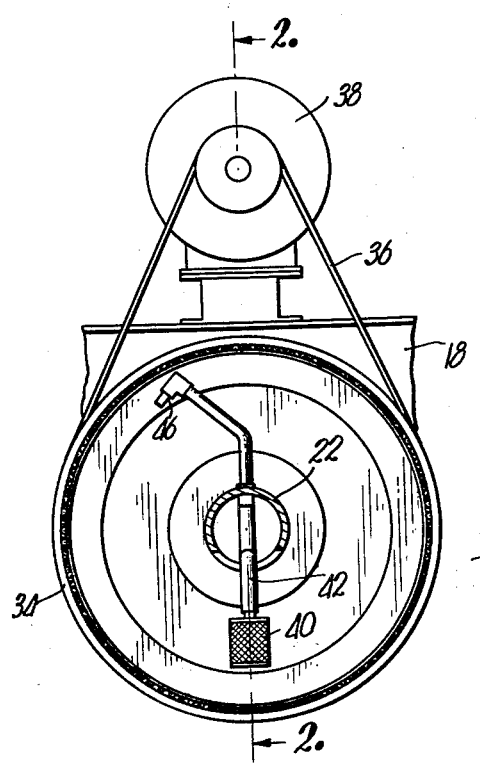
INVENTOR.
Burks Alden Smith
BY
Hovey, Schmidt, Johnson & Hovey
ATTORNEYS.

United States Patent Office 3,188,288
Patented June 8, 1965

3,188,288
METHOD FOR CONTROLLING THE MICROBE AND SOLID MATERIALS IN SEWAGE TREATMENT EQUIPMENT
Burks Alden Smith, Shawnee Mission, Kans., assignor to Union Tank Car Company, Chicago, Ill., a corporation of New Jersey
Filed Mar. 12, 1962, Ser. No. 178,870
6 Claims. (Cl. 210—11)

This invention relates to sewage purification, and more particularly to treatment of sewage through the action of biological organisms.

It is well known that sewage is acted upon by such microbes as bacteria, fungi, algae, viruses, protozoa, rotifers and crustaceans and that these organisms grow from the metabolism of organic and inorganic substances in sewage. The metabolic reaction may be expressed: food+microbes→more microbes+end products+energy. The "end products" of the reaction vary and may include $CO_2$, $H_2O$ and $NO_3$ or $CH_4$ and $CO_2$ depending upon whether the reaction is aerobic or anerobic.

The organisms important to the biological treatment of sewage vary greatly in size. They may range from bacteria of from .5 to 2 microns to rotifers in the 50 to 150 micron range. Bacteria and algae are primarily important in the conversion of soluble wastes to end products and the larger protozoa and rotifers are more important in the metabolizing of insoluble or solid wastes to the end products.

The elimination of the waste substrate from the sewage solution by the organisms is dependent upon the organism concentration or mass and the amount of food available to the organisms. This removal process is expressible as $\Delta F = \Delta M + E$ where $\Delta F$ is the food at any instant, $\Delta M$ is the biological mass at any instant, and $E$ is energy.

Where the substrate is unlimited, the removal thereof is related to the growth of the biological mass and may be expressed:

$$\frac{dF}{dt} = K\frac{dM}{dt}$$

where K is a constant.

If the food is unlimited, the growth of the biological mass is a logarithmetic function. On the other hand, even though food will be partially assimilated by the organisms if the food is in limited supply, the assimilation will never be quite complete. Neither will the organisms reproduce in an environment of limited food supply.

It is readily apparent that control of the biological mass in a sewage treatment process is imperative to good waste treatment. If the growth rate of the microbe population can be enhanced, the biological mass can be kept at a maximum, thereby insuring effective biological treatment of the sewage in the process. Further, with the mass at a maximum, the time required during the treatment may be minimized.

Assuming natural phenomena favorable to biological growth, such as proper pH, temperature and the presence of sufficient oxygen, carbon dioxide, trace minerals and the like, the greatest biological concentration can be achieved if unlimited food is available and if the organisms are retained in the treating plant. Manifestly, if not otherwise controlled, the organisms flow through the treating plant and out with the effluent without build-up of the microbe concentration to an adequate level.

Heretofore, efforts have been made to maintain the biological population at a necessary level by separating the microbe containing "sludge" from the effluent sewage by sedimentation and returning it to the influent sewage until the desired microbe concentration is attained. Such efforts require extensive settling tanks and pumping equipment, are time-consuming, eliminate a constant flow of sewage through the treatment process, and have not generally met with widespread acceptance and success in sewage treatment.

Accordingly, it is the most important object of this invention to provide a method and apparatus for treating sewage wherein the biological population in the treating process may be effectively controlled.

Another important object of the instant invention, and in the achievement of the foregoing object, is to effect selective control of the food source available to the treating microbes by selectively retaining certain solid materials while permitting normal discharge of the remaining effluent sewage.

Yet a further important object of this invention is to provide a method and apparatus for retaining the relatively large particles of degradable sewage material in the process until the particles are reduced to a predetermined size.

Still another object of the invention is to increase the capacity of a sewage treatment process by selectively retaining the degradable material in the process for an undetermined length of time sufficient to adequately treat those degradable materials, yet permit a ready flow through the process of the hydraulic volume relatively free from degradable material.

Another object of this invention is to provide such a method of sewage treatment which can be quickly and easily carried out without the necessity of costly and elaborate apparatus.

Other objects of the invention will be pointed out or will become apparent in the specification and claims.

In the drawing:

FIGURE 1 is a fragmentary, vertical, cross-sectional view of a sewage tank on a reduced scale, showing the classifier apparatus utilized in carrying out the principles of this invention;

FIG. 2 is a vertical, cross-sectional view of the classifier apparatus taken along line 2—2 of FIG. 3; and FIG. 3 is a cross-sectional view taken along line 3—3 of FIG. 2.

Referring initially to FIGURE 1, a sewage tank 10 includes a digestion chamber 12 wherein the sewage is subjected to a biological treatment process and in which oxygen may be introduced into the tank by apparatus (not shown), a primary settling basin 14 in communication with digestion chamber 12, and a clarified liquid basin 16 communicating with chamber 12 and basin 14. A baffle 18 extends in partial closing relationship between basins 14 and 16.

Classifier apparatus broadly numerated 20, includes a tubular shaft 22 carried by baffle 18 and extending into basin 16. A rotary drum broadly designated 24, having a pair of closed ends 26 and 28, is journalled on the portion of shaft 22 which extends into basin 16 and is provided with an annular opening 30 between ends 26 and 28, which opening is covered with sieve means in the form of a screen 32. A pulley 34 on drum 24 accommodates a belt 36 which is powered by motor 38 for rotating drum 24. A strainer 40 within drum 24 is in fluid communication with a pump (not shown) by means of a conduit 42. A pipe 44 extends from the pump and into the interior of drum 24 through shaft 22 and terminates in a plurality of nozzles 46 disposed to direct a spray against the inner surface of screen 32.

Shaft 22 is coupled with an outlet pipe 48 for tank 10 through a T 50. It will be understood that outlet pipe 48 may be connected with any suitable discharge means for the sewage after it has been treated in tank 10.

In operation, the sewage is admitted to tank 10 wherein it undergoes the biological treatment by microbe organisms as is well known in the art. When the sewage reaches a level as shown by the dotted line 52 in FIG. 1, it may flow through screen 32, shaft 22, and out the outlet pipe 48. Although the sewage has undergone the treatment process in passing through tank 10 and into the clarified basin 16, the sewage within basin 16 will not be entirely free from solid particles. These particles are retained within tank 10 by screen 32 which will permit only the passage of the liquid content of the sewage and those particles which are relatively small and able to pass through screen 32. It will be understood that the size of particle which can pass through classifier 20 may be selectively controlled by utilization of sieves or screens having various sized openings. The rotation of drum 24 and the direction of pressurized fluid against the inside of screen 32, maintains the latter in a clean condition and avoids the obstruction which would otherwise occur to the screen through the solid particles of the sewage adhering thereto. The fluid which is directed through nozzles 46 against screen 32, is maintained relatively free from any solid particles by obtaining the fluid from the interior of drum 24 after it has been once screened and then passing the fluid through strainer 40 for further elimination of any solid particles which would have a tendency to clog nozzles 46.

By controlling the size of solid particles which may pass out of tank 10 through outlet 48, it is possible to control the growth rate and the population of the organisms in tank 10 which are necessary in carrying out the proper treatment process. The solid particles constitute the main course of food for the beneficial microbes and, as has previously been pointed out, maintenance of the food level by retaining the larger solid particles in tank 10 enhances the growth rate of the microbes.

Additionally, the organisms which convert the solid particles to the end products in the process, cling to the outer surfaces of the food particles and would pass with these particles, through the treatment tank, were it not for the screening by classifier 20. The retention of these clinging organisms not only aid in the maintenance of a relatively large biological population within tank 10 to accommodate any increased inflow of sewage or "shock load," but also permits the initial build-up of the biological population in a new treating unit. Were it not for the screening of the solid particles, the organisms would be carried out with the effluent as they developed and would never build up to the level necessary for the treating process.

Through utilization of classifier 20 it is possible to retain the solid particles in the treating tank for an indeterminate length of time until the particles have been degraded to a size which can pass through screen 32. This permits a control of the particles in the effluent to a size which is not objectionable. Those solids which are not acted upon by the organisms are reduced in size either by cellular collapse, or by attrition until they can pass through the classifier 20.

Control of the particles in the effluent reduces the time necessary for maintaining the sewage in tank 10 by withholding those degradable materials from the effluent, yet permitting relatively rapid hydraulic flow through tank 10. Ordinarily, it is not necessary to treat the liquid component of the sewage and the relatively fine particles very extensively, and it is not necessary to retain these components for such extended treatment.

Inasmuch as domestic sewage contains a relatively small amount of organisms which reduce the soluble content of the sewage to the end products, it is ordinarily not necessary to attempt to retain these organisms in the treating tank. However, if it is desirable to retain these relatively small organisms, such can easily be done by either choosing a screen 32 having exceptionally fine mesh openings or passing the effluent through a second screening stage.

It has been found that for normal sewage treatment operations, a single screen having mesh openings anywhere from 30 to 150 microns in diameter, is entirely adequate. Preferably, however, mesh openings of 70 microns in diameter are used for the single screen.

When it is considered necessary or desirable to utilize a second screen in conjunction with the first screen, the mesh openings of the second screen are preferably 1 micron in diameter.

While one form of the invention has been illustrated, it will be apparent to those skilled in the art that various changes and modifications may be made therein without departing from the spirit or scope of the invention.

I claim:

1. A method of retaining sufficient solid organic material in a sewage treating system to enhance the growth rate of living organisms capable of abstracting substances from said solid organic material and maintain the organism population at a maximum level, said method comprising the steps of:
   (a) confining a quantity of the sewage;
   (b) impinging directly on the surface of a mechanical filter screen having openings of a size between about 1 to 150 microns in the discharge liquid flow from said system, solid organic material and organisms in such size range;
   (c) moving at least a portion of said filter above the upper surface of said liquid so as to elevate the impinged solid organic material and organisms above said confined sewage;
   (d) continuously cleaning down to the bare surface of said filter by removing substantially all of the elevated-impinged solid organic material and organisms therefrom
   (e) returning the thus removed solid organic material and organisms to said confined sewage; and
   (f) sequentially repeating steps (b) through (e) as defined above.

2. The method defined in claim 1 wherein said particles are impinged on one side of said filter and washed therefrom by spraying a liquid through said filter from the opposite side thereof.

3. A method of treating sewage containing liquids, solids and living organisms capable of extracting substances from the solids, said method comprising the steps of:
   (a) confining a quantity of said sewage;
   (b) subjecting said sewage to a biological treatment process;
   (c) discharging the liquid content and the relatively fine solid particles of the sewage through a mechanical filter screen having openings between 1 to about 150 microns in size so as to impinge directly thereon, particles in such size range;
   (d) continuously cleaning down to the bare surface of said filter by removing substantially all of the impinged particles from said filter; and
   (e) returning the thus removed particles to said confined sewage,
   (f) and sequentially repeating the steps defined in (c) through (e) above, whereby sufficient solid organic material is retained to enhance the growth rate of the organisms and maintain the organism population at a maximum level to facilitate the treatment process.

4. A method as set forth in claim 3, wherein said size is within the range of about 30 to 150 microns.

5. A method as set forth in claim 3, wherein said size is about 70 microns.

6. In an activated sludge method of treating liquid sewage containing relatively dilute concentrations of solids and living organisms, comprising:
   (A) confining a quantity of said sewage;
   (B) introducing oxygen into the confined sewage so as to facilitate biological treatment of the sewage by said organisms;

(C) the improved method of retaining sufficient solid organic matter to promote growth of the organisms and bring the organism population to a maximum level that enhances the biological treatment process, comprising:
  (a) discharging the liquid content of the treated sewage through a mechanical filter screen having openings in the size range of about 1 to 150 microns in such a manner that substantially all solid living organisms and their solid food of a size substantially in said range are impinged directly on the surface of said sieve means;
  (b) continuously cleaning down to the bare surface of said filter by removing substantially all of the impinged solids from the surface of said sieve means;
  (c) returning the thus removed solids to said confined sewage; and
  (d) sequentially repeating steps (a) through (c) as defined above.

References Cited by the Examiner

UNITED STATES PATENTS

| | | | |
|---|---|---|---|
| 817,996 | 4/06 | Smith | 210—499 X |
| 1,225,696 | 5/17 | Bicalky | 210—391 |
| 2,146,542 | 2/39 | Hawley | 210—13 X |
| 2,267,086 | 12/41 | Donohue | 210—391 X |
| 2,830,947 | 4/58 | Griffith | 210—17 |
| 2,987,186 | 6/61 | Burgoon et al. | 210—7 X |

OTHER REFERENCES

"Millipore," Technical Brochure 759, Millipore Filter Corp., Bedford, Mass., 28 pages, July 1959.

"Application of the Microstrainer to Water Treatment in Great Britain," Hazen, Jour. AWWA, July 1953, vol. 45, pp. 723–737.

"Use of Microstrainer Unit at Denver," Turre, Jour. AWWA, March 1959, vol. 51, pp. 354–363.

MORRIS O. WOLK, *Primary Examiner.*
ALEXANDER WYMAN, *Examiner.*